US009319215B2

(12) United States Patent
Bao et al.

(10) Patent No.: US 9,319,215 B2
(45) Date of Patent: Apr. 19, 2016

(54) METHOD OF PROCESSING IN RANDOM ACCESS PROCEDURE, SYSTEM AND APPARATUS THEREOF

(75) Inventors: Wei Bao, Beijing (CN); Zhuo Gao, Beijing (CN); Huiru Kou, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 793 days.

(21) Appl. No.: 12/745,118

(22) PCT Filed: Nov. 21, 2008

(86) PCT No.: PCT/CN2008/001937
§ 371 (c)(1),
(2), (4) Date: Jun. 25, 2010

(87) PCT Pub. No.: WO2009/079913
PCT Pub. Date: Jul. 2, 2009

(65) Prior Publication Data
US 2010/0302998 A1 Dec. 2, 2010

(30) Foreign Application Priority Data
Nov. 27, 2007 (CN) .......................... 2007 1 0178186

(51) Int. Cl.
*H04L 7/00* (2006.01)
*H04L 29/08* (2006.01)
*H04W 74/00* (2009.01)
*H04W 74/08* (2009.01)

(52) U.S. Cl.
CPC ................ *H04L 7/0016* (2013.01); *H04L 7/00* (2013.01); *H04L 67/1095* (2013.01); *H04W 74/008* (2013.01); *H04W 74/0833* (2013.01)

(58) Field of Classification Search
CPC . H04W 74/0891; H04W 36/08; H04W 74/08; H04W 74/0833; H04L 7/0016; H04L 7/00; H04L 67/1095
USPC ........................................................ 370/315
See application file for complete search history.

(56) References Cited

U.S. PATENT DOCUMENTS 7,843,895 B2 * 11/2010 Park et al. ..................... 370/350
2009/0252125 A1 * 10/2009 Vujcic .......................... 370/336

(Continued)

OTHER PUBLICATIONS

Lee et al, "Translation of U.S. Appl. No. 60/973,177", Sep. 18, 2007.*

*Primary Examiner* — Omer S Mian
(74) *Attorney, Agent, or Firm* — Nixon Peabody LLP

(57) ABSTRACT

The present invention proposes a method processing in random access procedure, comprising the following steps: when a Preamble transmitted by a random access node is detected by a base station, the base station calculating TA according to the Preamble detected by itself and transmitting it to the random access node; the base station receiving random access detection information reported from a transparent relay station and selecting a service node for the random access node; the base station receiving an uplink signaling transmitted by the random access node after the random access node adjusted the uplink timing advance according to TA calculated by the base station, and notifying the random access node of the access condition through a contention resolution message according to the selected service node, and the random access node performing an access procedure based on the access condition. According to the present invention, the duration of the random access procedure can be shortened, and the service QOS can be improved, which gives the user better service experience.

16 Claims, 3 Drawing Sheets

(56) References Cited

U.S. PATENT DOCUMENTS

2010/0093386 A1* 4/2010 Damnjanovic et al. ....... 455/522
2011/0009114 A1* 1/2011 Haartsen ....................... 455/423
2011/0032889 A1* 2/2011 Lee et al. ...................... 370/329

* cited by examiner

METHOD OF PROCESSING IN RANDOM ACCESS PROCEDURE, SYSTEM AND APPARATUS THEREOF

TECHNICAL FIELD

The present invention relates generally to mobile communication technique, and more particularly to a method of processing in random access procedure, system and apparatus thereof.

BACKGROUND OF THE INVENTION

In order to meet the demand of user terminal on full coverage and high capacity of system, relay station (RS) may be used a lot in future mobile communication systems. Relevant definitions of RS are provided as follows:

RS: it is a random access node with the function of transmitting data of user terminal or control signaling between nodes, wherein to transmit data of user terminal or control signaling between nodes includes: transmitting data of user terminal or control signaling between base station (BS) and RS, between RS and RS, as well as between RS and user terminal (UT).

Transparent relay station: it does not transmit downlink synchronous channel broadcast message, system configuration broadcast message and resources allocation broadcast message.

Non-transparent relay station: it transmits its own downlink synchronous channel broadcast message, system configuration broadcast message and resources allocation broadcast message.

Access link: it is a wireless link starting or terminating at UT.

Relay link: it is a wireless link between BS and RS or between RS and RS.

Compared with BS, RS has the advantages of flexible arrangement and low cost, so that network construction cost can be saved. The introduction of the RS can expand the capacity of system, enlarge the coverage area of cell, and increase the transmission data rate.

For a more complete understanding of the relationship between RS and BS, reference is made to the following description taken in conjunction with the drawings. FIG. 1 is a schematic view of different application scenes and effects of RSs in the prior art. In practical use, the coverage area of transparent RS falls in the coverage area of BS entirely, while the coverage area of non-transparent RS may be partially or completely outside the coverage area of BS. As shown in FIG. 1, RS2 for providing hotspot coverage is a transparent RS, while RS1 for enlarging the coverage area of BS and RS3 for solving shadow effect are non-transparent RSs.

The foregoing are definitions associated with RS in the prior art, and then the random access procedure performed by the user terminal in the mobile communication system will be described hereinafter in detail.

In the mobile communication system, it is necessary to satisfy a specific transmission condition, i.e. uplink synchronization, for uplink data transmission, so that the uplink signals from different distances and/or different user terminals to arrive at base station or relay station synchronously. Uplink synchronization can bring the system a lot of advantages, such as reducing signal interference between adjacent time slots, improving the performance of the system, and simplifying the design of base station/relay station receiver. Therefore, before uplink data transmission, it is necessary for the user terminal in an asynchronous state to establish uplink synchronization with the network through a random access procedure, and then the user terminal performs uplink data transmission in the manner of uplink synchronization.

The basic mechanism of the random access solution used in 3GPP long term evolution (LTE) system is: a user terminal randomly selects one random access preamble among a set of random access preambles, and transmits the selected random access preamble on Random Access Channel (RACH), wherein the random access preamble is called Preamble hereinafter; after receiving the Preamble, the base station calculates the is difference between the actual time of arrival and expected time of arrival of the Preamble, puts this difference into a random access response as Timing Alignment (TA) and transmits the random access response to the user terminal; after receiving the random access response, the user terminal adjusts the time for transmitting uplink data based on the TA in order to establish the uplink synchronization with the network. After the above TA adjustment process is finished, the user terminal need to send its identity (ID) to the network. The network then judges whether the user terminal collides with other user terminals according to the ID transmitted by the user terminal and generates a contention resolution message to send this message to the user terminal so as to eliminate the collision thoroughly. In the LTE system, the random access procedure carried out in the scenario where the system does not include transparent relay stations is different from that carried out in the scenario where the system includes transparent relay stations. The random access procedure of the user terminal in the instance of including transparent relay station will be described in detail hereinafter.

FIG. 2 is a schematic flowchart of a random access method of user terminal in the case of the base station dominates transparent relay stations in the prior art. The said method includes following steps.

Step 201, the user terminal randomly selects one Preamble from all available Preambles, and transmits the selected Preamble on RACH.

Step 202, both the base station and the transparent relay stations listen to the RACH. If the Preamble is detected, the received power of the received Preamble is recorded and the TA corresponding to this Preamble is calculated. The base station starts a timer T while performing RACH detection, and waits for the dominated transparent relay stations to report the detected random access detection information in a time period set by the timer.

Step 203, the transparent relay stations report random access detection information of the detected Preamble to the base station by which they are dominated, wherein the random access detection information includes:

the identification information of the received Preamble, such as the index and transmitting time of the Preamble;

the received power of the received Preamble; and the TA corresponding to the received Preamble.

Step 204, after the timer set in the step 202 is timeout, the base station selects the base station or a certain transparent relay station as a service node of the user terminal that initiates the random access procedure, according to its measurement results and the information contained in the random access detection information received from its dominated transparent relay stations.

It is well known in the prior art how a base station selects a service node, and it is unnecessary to go into details here.

Step 205, the base station transmits random access response with respect to the Preamble, and the random access response includes:

the identification information of the Preamble corresponding to the response information, such as the index and transmitting time of Preamble;

TA with respect to the Preamble corresponding to the response information; wherein if the base station selects the base station as the service node in the step 204, the TA here is the TA corresponding to the Preamble detected by the base station, if the service node selected by the base station in the step 204 is a transparent relay station, the TA here is the TA corresponding to the Preamble reported by the selected transparent relay station;

the time-frequency position information of the channel resources allocated for the subsequent uplink data transmission; and the temporary ID for users allocated by the base station (C-RNTI, Cell Radio Network Temporary Identity, C-RNTI).

Step 206, after receiving the random access response, the user terminal determines whether the target user terminal of the random access response is the user terminal itself according to the identification information of the Preamble in the random access response, i.e. judges whether the identification information of the Preamble in the random access response is the same as the identification information of the Preamble selected by itself in the step 201. If they are identical, the transmission timing advance of the uplink signal is adjusted in accordance with the TA included in the random access response; if they are different, no operation is performed and the random access response continues to be received. There are two situations in the latter case: the user terminal determines that the Preamble transmitted itself receives no response and thus initiates the random access procedure again or gives it up; or the user terminal obtains its random access response from the continuously received random access response and continues to execute the subsequent operations.

Step 207 is executed if the service node selected in the step 204 is the base station, while step 209 is executed if the service node selected in the step 204 is a transparent relay station.

Step 207, the user terminal transmits uplink signaling, which uses uplink resources that are allocated by the base station in the step 205. The uplink signaling transmitted by the user terminal includes at least identification information of the user terminal, such as International Mobile Subscriber Identity (IMSI), or Temporary Mobile Subscriber Identity (TMSI), or C-RNTI.

Step 208, the base station determines whether the user terminal collides with other user terminals according to the identification information of the user terminal transmitted by the user terminal in the step 207, and notifies the user terminal of collision detection result through a contention resolution message.

Then, the random access procedure is finished, and the user terminal formally begins the uplink data transmission service.

Step 209, the user terminal transmits uplink signaling to the transparent relay station that is selected as its service node, which uses uplink resources that are allocated by the base station in the step 205.

The uplink signaling transmitted by the user terminal at least includes identification information of the user terminal, such as IMSI, or TMSI, or C-RNTI.

to Step 210, the transparent relay station served as the service node transmits the uplink signaling received in the step 209 to the base station.

Step 211, the base station determines whether the user terminal collides with other user terminals according to the identification information of the user terminal transmitted by the user terminal in the step 209, and notifies the transparent relay station of the collision detection result through a contention resolution message.

The details of the contention resolution message have not been determined in the prior art.

Step 212, the transparent relay station transmits the contention resolution message received in the step 211 to the user terminal.

Then, the random access procedure is finished, and the user terminal formally begins the uplink data transmission service.

The disadvantages of the prior art lie in: in the current random access procedure in which the transparent relay stations participate, the base station starts a timer T while detecting the Preamble on the RACH, and will always wait for its dominated transparent relay station to report the random access detection information before the timer is timeout. The base station does not select service node for the user terminal according to its detection results and information reported by its dominated transparent relay stations until the timer T is timeout. Due to the length of the timer T and the long time taken in judging process for selecting the service node, the random access procedure of the user terminal lasts for long time.

SUMMARY OF THE INVENTION

Owing to the above, the object of the present invention is to propose a method of processing in random access procedure, system and apparatus thereof. According to the present invention, the duration of the random access procedure is shortened in the case of the base station dominates transparent relay stations.

This object is achieved by the following technical solution of the present invention: the present invention proposes a method processing in random access procedure, comprising the following steps: when a Preamble transmitted by a random access node is detected by a base station, the base station calculating TA according to the Preamble detected by the base station itself and transmitting the TA to the random access node; the base station receiving random access detection information reported from a transparent relay station and selecting a service node for the random access node; and the base station receiving an uplink signaling transmitted by the random access node after an uplink timing advance is adjusted by the random access node according to the TA calculated by the base station, and notifying the random access node of an access condition through a contention resolution message according to the selected service node, and the random access node performing the random access procedure based on the access condition.

As one embodiment of the present invention, the base station notifying the random access node of the access condition through the contention resolution message according to the selected service node comprising: if the base station selects the base station as the service node for the random access node, the base station notifying the random access node of a collision detection result; if the base station selects the transparent relay station as the service node for the random access node, the base station transmitting the TA calculated by the transparent relay station and the collision detection result to the random access node through the contention resolution message.

As one embodiment of the present invention, after the base station transmitted the TA calculated by the transparent relay station and the collision detection result to the random access node through the contention resolution message, further comprising: the random access node adjusting the uplink timing advance based on the TA calculated by the transparent relay station.

As one embodiment of the present invention, the base station transmitting the TA calculated by the transparent relay station and the collision detection result to the random access node through the contention resolution message comprising: the base station transmitting the contention resolution message carrying the TA calculated by the transparent relay station and the collision detection result to the transparent relay station; and the transparent relay station transmitting the contention resolution message to the random access node.

As one embodiment of the present invention, after the Preamble transmitted by the random access node is detected by the base station, further comprising: the base station starting a timer, and selecting the service node for the random access node after the timer is timeout.

As one embodiment of the present invention, the base station calculating the TA according to the Preamble detected by the base station itself and transmitting the TA to the random access node comprising: the base station transmitting the TA calculated by the base station to the random access node through a random access response.

In the above embodiment, the random access node is a user terminal or a relay station.

The present invention further proposes a method processing in a random access procedure comprising the following steps. A random access node transmitting a Preamble to a base station; the random access node receiving TA calculated by the base station according to the Preamble detected by the base station itself, and adjusting an uplink timing advance according to the TA calculated by the base station; the random access node transmitting uplink signaling to the base station; the random access node receiving contention resolution message transmitted by the base station. If the contention resolution message carries the TA calculated by a transparent relay station, the random access node adjusting the uplink timing advance according to the TA calculated by the transparent relay station.

As one embodiment of the present invention, after the random access node received the TA calculated by the base station according to the Preamble detected by the base station itself, further comprising: the base station receiving random access detection information reported from the transparent relay station and selecting a service node for the random access node.

As one embodiment of the present invention, after the random access node transmits the uplink signaling to the base station, further comprising: if the base station selects the base station as the service node for the random access node, the base station notifying the random access node of a collision detection result; if the base station selects the transparent relay station as the service node for the random access node, the base station transmitting the TA calculated by the transparent relay station and the collision detection result to the random access node through the contention resolution message.

As one embodiment of the present invention, the random access node receiving the contention resolution message transmitted by the base station comprising: the base station transmitting the contention resolution message carrying the TA calculated by the transparent relay station and the collision detection result to the transparent relay station; and the transparent relay station transmitting the contention resolution message to the random access node.

As one embodiment of the present invention, after the random access node transmitted the Preamble to the base station, further comprising: the base station starting a timer, and selecting the service node for the random access node after the timer is timeout.

As one embodiment of the present invention, the random access node receiving the TA calculated by the base station according to the Preamble detected by the base station itself comprising: the random access node receiving the TA calculated by the base station transmitted by the base station through a random access response.

In the above embodiment, the random access node is a user terminal or a relay station.

The present invention further proposes a system processing in random access procedure, the system comprising a base station, transparent relay stations and at least one random access node. The base station is used for, when a Preamble transmitted by the random access node is detected by the base station, calculating a TA according to the Preamble detected by the base station itself and transmitting the TA to the random access node, receiving random access detection information reported from the transparent relay station and selecting a service node for the random access node, as well as after the base station receives an uplink signaling transmitted by the random access node, notifying the random access node of an access condition through a contention resolution message according to the selected service node. The transparent relay stations are used for transmitting the TA calculated by the transparent relay station to the base station through the random access detection information when the Preamble transmitted by the random access node is detected. The random access node is used for transmitting the Preamble to the base station, and transmitting the uplink signaling to the base station after adjusted the uplink timing advance based on the TA calculated by the base station transmitted from the base station, receiving an access condition transmitted by the base station through the contention resolution message and performing the random access procedure based on the access condition.

As one embodiment of the present invention, when the base station selects a transparent relay station as the service node for the random access node, the access condition includes the TA calculated by the transparent relay station.

In the above embodiment, the random access node is a user terminal or a relay station.

The present invention further proposes a base station for realizing random access. The base station comprises Preamble detecting module, Preamble processing module, random access response generating module and data transmitting module. The Preamble detecting module is used for detecting Preamble transmitted by a random access node that initiates random access on RACH. When the Preamble is detected, the Preamble detecting module transmits the Preamble to the Preamble processing module. The Preamble processing module is used for recording the received power of the Preamble, calculating TA corresponding to the Preamble, and transmitting the above information to the random access response generating module. The random access response generating module is used for generating a random access response that includes the TA calculated by the base station after receiving the information from the Preamble processing module, and transmitting the random access response to the data transmitting module. The data transmitting module is used for transmitting the received random access response.

As one embodiment of the present invention, the Preamble processing module is further used for transmitting a control signal to a timing module when the Preamble detecting module begins to detect Preamble on RACH. Correspondingly, the base station further comprising: a timing module, for starting a timing device upon receiving the control signal and transmitting a time end signal to a service node selecting module when the set time is out; a data receiving module, for receiving the random access detection information corresponding to the Preamble transmitted by the transparent relay station dominated by the base station, transmitting the random access detection information to the service node selecting module, and receiving an uplink signaling transmitted from the random access node and transmitting the uplink signaling to a contention resolving module; a service node selecting module, for selecting a service node served for the random access node that transmits the Preamble according to the received random access detection information and the information of the Preamble detected by the service node selecting module itself after the time end signal is received, and transmitting the information of the selected service node to the contention resolving module; a contention resolving module, for determining whether the random access node collides with other random access nodes based on the received uplink signaling, and generating access condition in combination with the received the information of the service node and transmitting the access condition to the data transmitting module through the contention resolution message. The data transmitting module is further used for transmitting the contention resolution message.

As one embodiment of the present invention, the Preamble detecting module is further used for transmitting a signal to the service node selecting module when detecting the Preamble from the random access node. Correspondingly, the service node selecting module is further used for transmitting the received random access detection information and the information of the service node to the random access response generating module upon receiving the signal from the Preamble detecting module after the service node selecting module has selected the service node; the random access response generating module is further used for generating the random access response based on the received random access detection information and the information of the service node and transmitting the random access response to the data transmitting module.

In the above embodiment, the random access node is a user terminal or a relay station.

The present invention further proposes a random access node for realizing random access. The random access node comprises Preamble transmitting module, random access response receiving module, timing advance adjustment module, uplink signaling transmitting module and contention resolution message receiving module. The Preamble transmitting module is used for transmitting a Preamble to the base station. The random access response receiving module is used for receiving a random access response transmitted by the base station. The said random access response includes a TA calculated by the base station based on the Preamble detected by the base station itself. The timing advance adjusting module is used for adjusting an uplink timing advance based on the TA calculated by the base station, and adjusting the uplink timing advance based on the TA calculated by the transparent relay station in the case that the contention resolution message carries the TA calculated by the transparent relay station. The uplink signaling transmitting module is used for transmitting the uplink signaling to the base station. The contention resolution message receiving module is used for receiving the contention resolution message transmitted by the base station. If the base station selects the transparent relay station as the service node for the random access node, the contention resolution message carries the TA calculated by the transparent relay station.

As one embodiment of the present invention, the random access node is a user terminal or a relay station.

In the present invention, after the base station receives the Preamble transmitted from the random access node, firstly it is acquiesced to select the base station as the service node for the random access node so that the selection process of the service node performed by the base station and the adjustment process of the uplink timing advance performed by the user terminal can be performed at the same time. Even if the base station selects the transparent relay station as the service node, the base station still can transmit the TA calculated by the transparent relay station to the user terminal through the contention resolution message, and the user terminal then adjusts the uplink timing advance according to the TA calculated by the transparent relay station. According to the present invention, it is unnecessary to transmit the random access response to the user terminal or the relay station until the service node has been selected, so that the duration of the random access procedure is shortened, and the service QOS is thus improved, which gives the user better service experience.

DETAILED DESCRIPTION OF THE INVENTION

The basic idea of the present invention is that after the base station detects the Preamble transmitted from the random access node, the base station is acquiesced as a service node firstly and then the information such as the TA calculated by the base station is transmitted to the random access node. The random access node adjusts the uplink timing advance according to the TA calculated by the base station. Meanwhile, the base station receives information reported by the transparent relay station and selects a service node for the random access node. If the base station selects the transparent relay station as the service node for the random access node, the base station transmits the TA calculated by the transparent relay station to the random access node through a contention resolution message, and the random access node adjusts the uplink timing advance again according to the received TA calculated by the transparent relay station.

Hereinafter the embodiments of the present invention will be illustrated in conjunction with figures.

Figure 3:
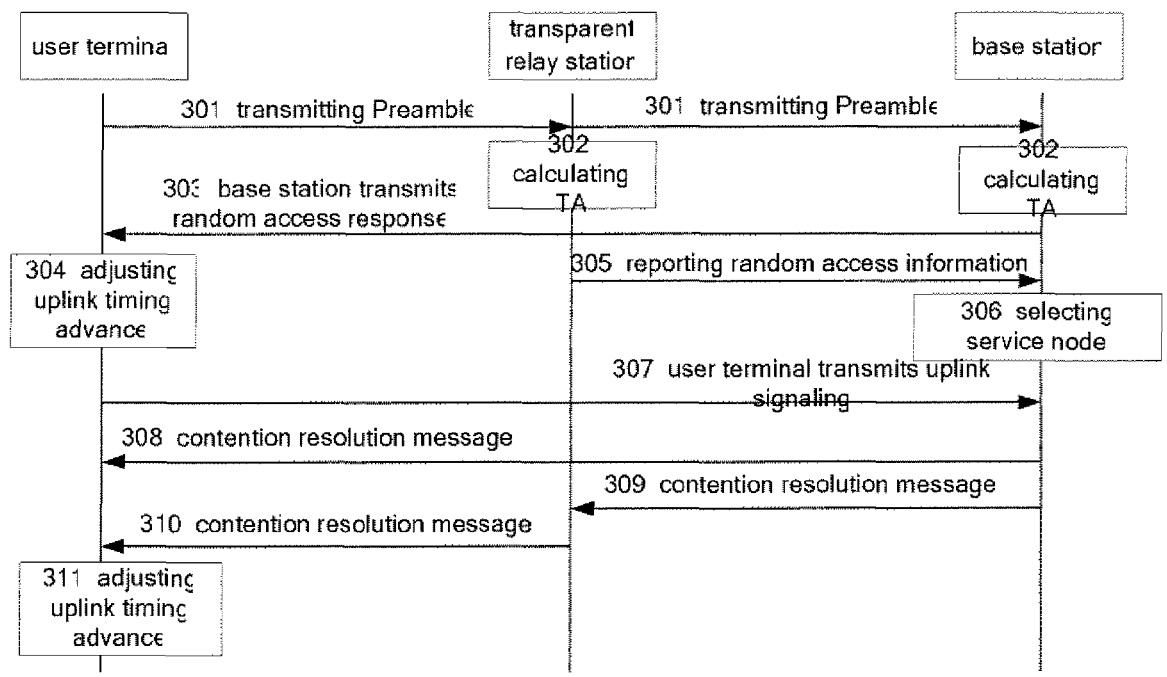
FIG. 3 is a schematic flowchart illustrating a random access method according to one embodiment of the present invention.

FIG. 3 is a schematic flowchart illustrating a random access method according to one embodiment of the present invention. The said method relates to processing of user terminal, transparent relay station and base station. It is noted that there may be one or more transparent relay stations, but FIG. 3 only shows the transparent relay station served as a service node without showing other transparent relay stations. As shown in FIG. 3, the method comprises the following steps:

Step 301, the user terminal randomly selects one Preamble from all available Preambles, and transmits the selected Preamble on RACH.

The method for transmitting the Preamble by a user terminal is well known in the prior art, and it is unnecessary to go into details here.

Step 302, both the base station and the transparent relay station listen to the RACH. If the Preamble is detected, both the base station and the transparent relay station need to record the received power of the detected Preamble and calculate the TA corresponding to this Preamble respectively to obtain corresponding random access detection information. The base station starts a timing device while performing RACH detection, wherein the timing device is used to set a time period for which the base station need to wait for its dominated transparent relay stations to report the detected random access detection information. The base station waits for its dominated transparent relay stations to report the detected random access detection information in the time period set by the timing device. The timing device may be a timer. The time period set by the timing device depends upon the practical situation, which is the same as in the prior art. The method of setting a time period is well known in the prior art, and it is unnecessary to go into details here.

Figure 1:
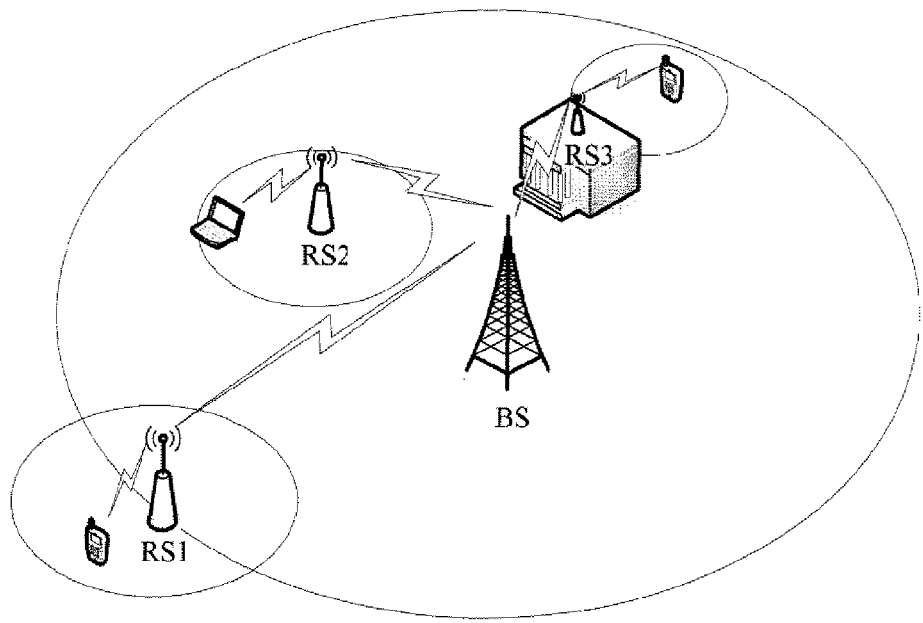
FIG. 1 is a schematic view of different application scenes and effects of RSs in the prior art.
Figure 2:
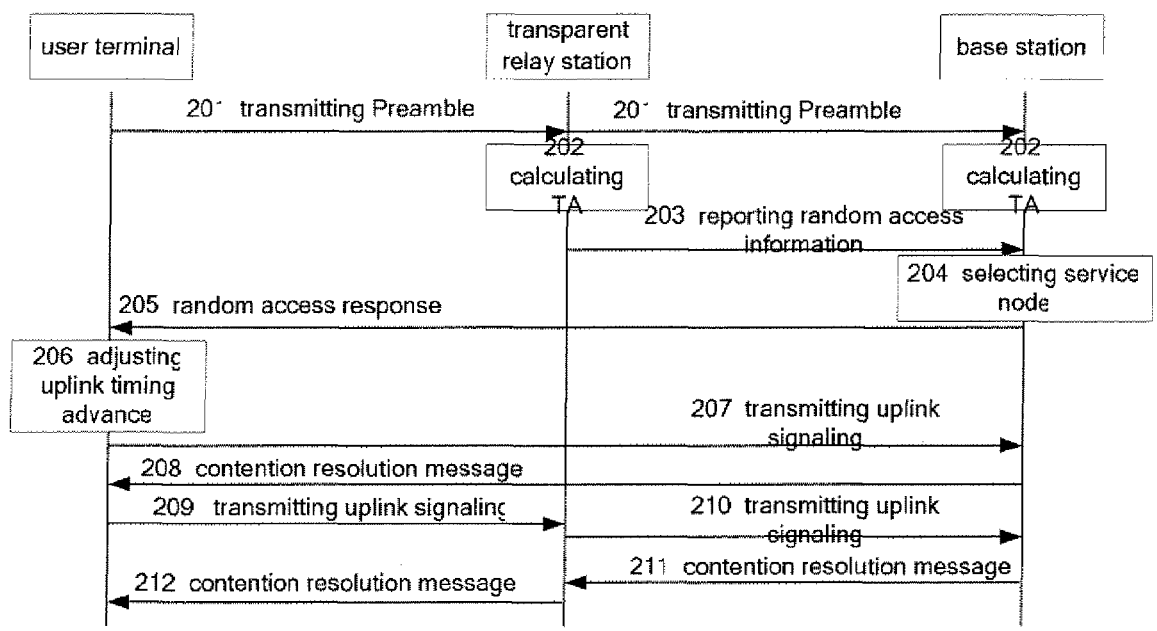
FIG. 2 is a schematic flowchart illustrating random access method of user terminal in the case that the base station dominates transparent relay stations in the prior art.

In this step, it is possible that the base station cannot detect the Preamble transmitted from the user terminal. When the base station detects the Preamble transmitted from the user terminal, step 303 is executed; when the base station does not detect the Preamble transmitted from the user terminal, according to the random access procedure in the prior art shown in FIG. 2, the base station waits for the dominated transparent relay stations to report the random access detection information, and executes the subsequent operations, i.e. step 203 and the subsequent steps following the step 203. As the subsequent processing operations are the same as in the procedure shown in FIG. 2, this will be not discussed here.

Furthermore, it is well known in the prior art how to detect the Preamble on the RACH and how to calculate the TA, and it is unnecessary to go into details here.

Step 303, the base station generates random access response of the Preamble based on the information of the Preamble detected by the base station itself, and transmits the random access response to the user terminal, wherein the random access response includes:

the identification information of the Preamble corresponding to the response information, such as the index and transmitting time of the Preamble;

the TA with respect to the Preamble corresponding to the response information, wherein the TA is detected by the base station;

the position information of channel resources allocated for the subsequent uplink data transmission; and the temporary ID for the user terminal allocated by the base station (C-RNTI).

to Step 304, after receiving the random access response, the user terminal determines whether the target user terminal of the random access response is itself according to the identification information of the Preamble in the random access response. If it is, the transmission timing advance of the uplink signaling is adjusted in accordance with the TA information in the random access response.

It is well known in the prior art how the user terminal determines the target user terminal of said information and how to adjust the transmission timing advance in accordance with TA, and it is unnecessary to go into details here.

Step 305, before or when the base station executes step 303, or after the base station transmits the random access response to the user terminal, the transparent relay station reports the detected random access detection information to the base station by which it is dominated. The said random access detection information includes:

the identification information of the Preamble detected by the transparent relay station, such as the index and transmitting time of the Preamble;

the received power of the Preamble detected by the transparent relay station; and the corresponding TA calculated by the transparent relay station based on the detected Preamble.

It is well known in the prior art how the transparent relay station reports the said information, and it is unnecessary to go into details here.

Step 306, when the time period set by the base station in the step 302 is finished, the base station may select itself or a certain transparent relay station as a service node of the user terminal that initiates the random access procedure according to its measurement results and the information contained in the random access detection information received from its dominated transparent relay stations in the step 305.

It is well known in the prior art how the base station selects a service node, and it is unnecessary to go into details here.

Step 307, after adjusting the transmission timing advance, the user terminal transmits uplink signaling to the base station, which uses uplink resources that are allocated by the base station in the step 303. The uplink signaling transmitted by the user terminal at least includes identification information of the user terminal, such as IMSI, or TMSI, or CRNTI. Next, Step 308 is executed if the base station selects itself as the service node in the step 306 while Step 309 is executed if the base station selects one of its dominated transparent relay stations as the service node in the step 306.

The execution order of the steps 303 and 305 can be exchanged but the steps 303, 304, 307 should be executed sequentially and the steps 305 and 306 should be executed sequentially. However, there is no limitation about the order between the execution of the steps 303, 304, 307 and the execution of the steps 305 and 306. The execution order can be adjusted flexibly if the above required execution order is not violated. For example, in the present embodiment, the step 304 and the steps 305 and 306 are executed at the same time, and the execution of the step 307 follows the step 306; in practical use, the step 307 may be executed before the step 306, or the step 307 and the step 306 may be executed synchronously. Other possible execution order will not be discussed in detail here.

Step 308, if the base station is selected as the service node of the user terminal, the base station determines whether the user terminal collides with other user terminals according to the identification information of the user terminal transmitted by the user terminal in the step 307, and notifies the user terminal of collision detection result through a contention resolution message. After that, the user terminal formally begins the uplink data transmission service, and the random access procedure is finished.

It is well known in the prior art how the base station determines whether the user terminal collides with other user terminals and how to generate the contention resolution message, and it is unnecessary to go into details here.

Step 309, if the transparent relay station is selected as the service node of the user terminal, the base station determines whether the user terminal collides with other user terminals according to the identification information of the user terminal transmitted by the user terminal in the step 307, and transmits the collision detection result to the transparent relay station selected as the service node of the user terminal through a contention resolution message. The contention resolution message should include at least the TA information reported by the transparent relay station selected as the service node. As the details of the contention resolution message are not confirmed in the prior art, the information such as TA calculated by the transparent relay station can be transmitted to the user terminal through the contention resolution message.

Step 310, the transparent relay station transmits the contention resolution message received in the step 309 to the user terminal.

When the transparent relay station is selected as the service node, the contention resolution message can be transmitted not only from the base station via the transparent relay station selected as the service node to the user terminal as described in the steps 309 and 310, but also directly from the base station to the user terminal without the help of the transparent relay station selected as the service node.

Step 311, after receiving the contention resolution message, the user terminal adjusts the transmission timing advance of the uplink signal according to the TA information (calculated by the transparent relay station) in the contention resolution message. Then the user terminal formally begins the uplink data transmission service and the random access procedure is finished.

The random access procedure of the user terminal shown in FIG. 3 can be expanded to the random access procedure of the relay station. When a relay station performs random access procedure, the method process is the same as that for the random access procedure of the user terminal shown in FIG. 3. The relay station performing the random access procedure may be either a transparent relay station or a non-transparent relay station. Relay station and user terminal are generally called random access node.

As one embodiment of the present invention, the present invention further proposes a system processing in random access procedure, which comprises a base station, a transparent relay station and at least one random access node. When the Preamble transmitted by a random access node is detected, the base station calculates a TA according to the Preamble detected by the base station itself, transmits it to the random access node, receives random access detection information reported from the transparent relay station, selects a service node for the random access node, and notifies the random access node of the access condition through a contention resolution message according to the selected service node after the base station receives the uplink signaling to transmitted by the random access node. The transparent relay station transmits the TA calculated by the transparent relay station to the base station through random access detection information upon detection of the Preamble transmitted by the random access node. The random access node transmits the Preamble to the base station, transmits uplink signaling to the base station after the uplink timing advance is adjusted according to the TA calculated by the base station from the base station, receives the access condition transmitted by the base station through the contention resolution message, and performs the access procedure based on the access condition. In the case that the base station selects the transparent relay station as the service node for the random access node, the access condition includes the TA calculated by the transparent relay station.

Figure 4:
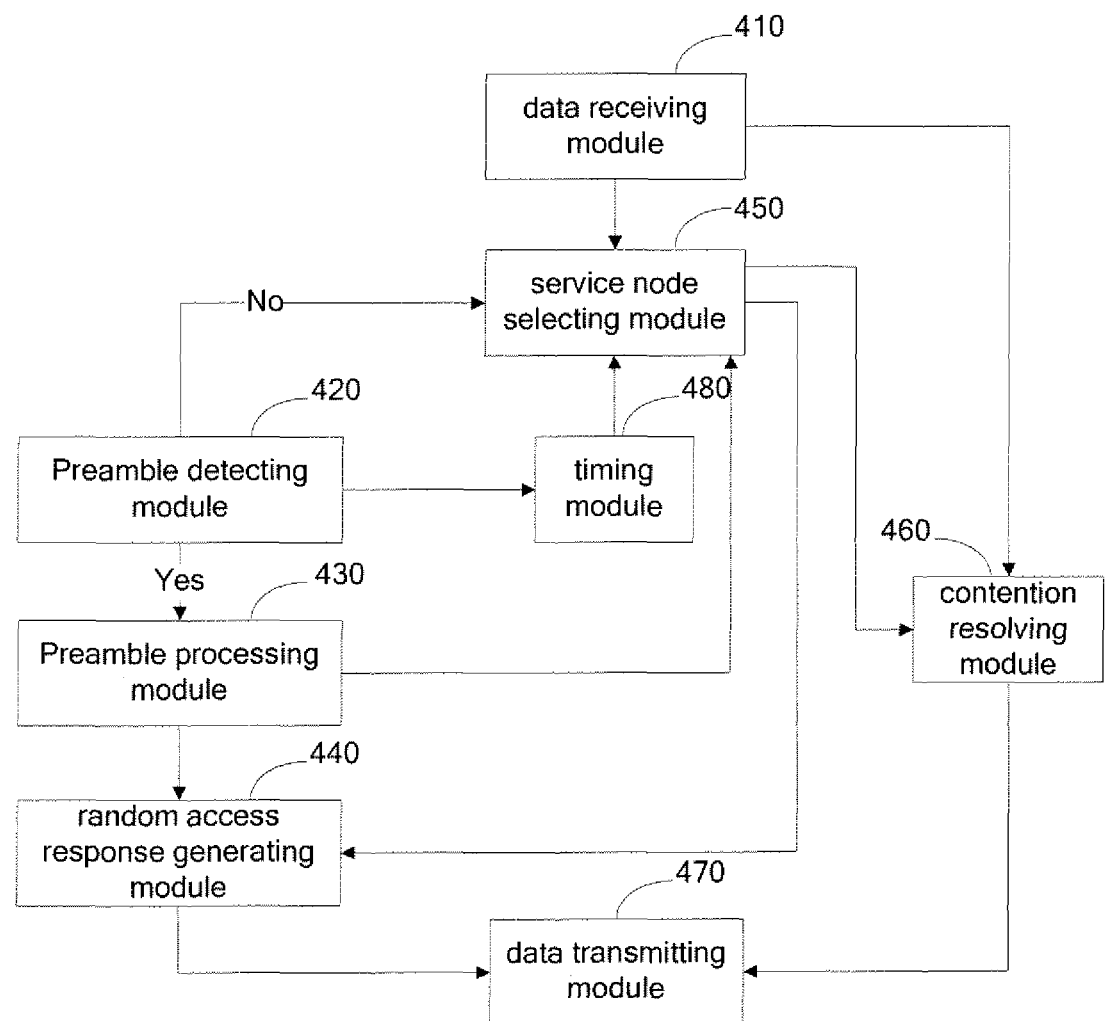
FIG. 4 is a schematic structural view illustrating a base station for realizing random access according to one embodiment of the present invention.

FIG. 4 is a schematic structural view illustrating a base station for realizing random access procedure according to one embodiment of the present invention. As shown in FIG. 4, the base station comprises data receiving module 410, Preamble detecting module 420, Preamble processing module 430, random access response generating module 440, service node selecting module 450, contention resolving module 460, data transmitting module 470 and timing module 480.

The data receiving module 410 receives the random access detection information transmitted from the transparent relay station, and transmits the random access detection information to the service node selecting module 450, and also transmits the uplink signaling received from the random access node to the contention resolving module 460.

The Preamble detecting module 420 detects the Preamble on RACH and transmits the Preamble to the Preamble processing module 430 if the Preamble is detected or transmits a signal, which is used to control the service node selecting module 450 to transmit the processed information to the random access response generating module 440, to the service node selecting module 450 if no Preamble is detected. Furthermore, the Preamble detecting module 420 transmits a control signal to the timing module 480 upon starting the detection of the Preamble on RACH, wherein the control signal is used to control the timing module 480 to start the timing device;

The Preamble processing module 430 records the received power of the Preamble transmitted from the Preamble detecting module 420, calculates the TA corresponding to said Preamble, and transmits the above information to the random access response generating module 440 and the service node selecting module 450.

The random access response generating module 440 generates random access response after receiving the information transmitted from the Preamble processing module 430 or the information transmitted from the service node selecting module 450, and transmits the random access response to the data transmitting module 470.

After receiving the signal transmitted from the timing module 480, the service node selecting module 450 selects a service node served for the random access node based on the random access detection information received from the data receiving module 410 and the information received from the Preamble processing module 430. If receiving the signal transmitted from the Preamble detecting module 420, the service node selecting module 450 transmits the above received information associated with the Preamble as well as the information of the selected service node to the random access response generating module 440; if the signal transmitted from the Preamble detecting module 420 is not received, the service node selecting module 450 transmits the information of the service node to the contention resolving module 460.

In the case of the Preamble detecting module 420 has not been able to detect the Preamble, the service node selecting module 450 can not receive the detection result of the Preamble obtained by the base station itself from the Preamble processing module 430. At this time, the service node selecting module 450 will directly select the service node according to the received random access detection information reported by the transparent relay station.

The contention resolving module 460 determines whether the random access node collides with other random access node based on the received uplink signaling, generates the contention resolution message and transmits it to the data transmitting module 470. When the contention resolving module 460 receives the information of the service node transmitted from the service node selecting module 450, it generates the contention resolution message in combination with the information of the service node and transmits it to the data transmitting module 470. At this time, the contention resolution message includes the information such as TA reported by the transparent relay station selected as the service node.

The data transmitting module 470 sends out the received random access response, and transmits the received contention resolution message to the transparent relay station or the random access node as the service node.

The timing module 480 starts a timing device upon receiving the control signal from the Preamble detecting module 420, and transmits a time end signal to the service node selecting module 450 when the set time is out.

The above random access node comprises: Preamble transmitting module, random access response receiving module, timing advance adjusting module, uplink signaling transmitting module and contention resolution message receiving module. The Preamble transmitting module transmits Preamble to the base station. The random access response receiving module receives the random access response transmitted by the base station. The random access response includes the TA calculated by the base station based on the Preamble detected by the base station itself. The timing advance adjusting module adjusts the uplink timing advance based on TA calculated by the base station, and adjusts the uplink timing advance based on TA calculated by the transparent relay station when the contention resolution message carries the TA calculated by the transparent relay station. The uplink signaling transmitting module transmits the uplink signaling to the base station. The contention resolution message receiving module receives the contention resolution message transmitted by the base station, wherein if the base station selects the transparent relay station as service node for the random access node, the contention resolution message carries the TA calculated by the transparent relay station. In the above embodiment, the random access node is a user terminal or a relay station.

In the present invention, after the base station receives the Preamble transmitted from the random access node, firstly it is acquiesced to select the base station as the service node for the random access node, so that the selection process of the service node performed by the base station and the adjustment process of the uplink timing advance performed by the user terminal can be performed at the same time. Even if the base station selects the transparent relay station as the service node, the base station still can transmit the TA calculated by the transparent relay station to the user terminal through the contention resolution message, and the user terminal then adjusts the uplink timing advance according to the TA calculated by the transparent relay station. According to the present invention, it is unnecessary to transmit the random access response to the user terminal or the relay station until the service node has been selected, so that the duration of the random access procedure is shortened, and the service QOS is thus improved, which gives the user better service experience.

The above said only relates to the preferred embodiments of the present invention, and is in no way construed to be limiting of the scope of protection of the present invention.

What is claimed is:

1. A method of processing in random access procedure, the method comprising:
    responsive to a Preamble transmitted by a random access node being detected by a base station, the base station starting a timer, the base station or every one of a number of transparent relay stations or both calculating a Timing Alignment (TA) according to the Preamble, and the base station transmitting the TA calculated by the base station to the random access node in a random access response before the expiration of the timer;
    the base station receiving random access detection information reported from at least one of the transparent relay stations;
    the base station, at the expiration of the timer, selecting one of the transparent relay stations or the base station as a service node for the random access node;
    the base station receiving an uplink signaling transmitted by the random access node after an uplink timing advance is adjusted by the random access node according to the Timing Alignment (TA) calculated by the base station;
    responsive to one of the transparent relay stations being selected as the service node, the base station notifying the random access node of an access condition in a contention resolution message sent through the selected service node to the random access node;
    responsive to the base station being selected as the service node, the base station notifying the random access node of the access condition in a contention resolution message sent to the random access node without relaying through the transparent relay stations;
    wherein the contention resolution message includes a collision detection result determined from identification information in the uplink signaling transmitted by the random access node; and
    wherein the random access node performs an access procedure based on the access condition and the collision detection result.

2. The method of processing in random access procedure as claimed in claim 1, wherein, after the base station transmits the collision detection result to the random access node through the contention resolution message, further comprising: the random access node adjusting the uplink timing advance based on the TA after the base station transmits the contention resolution message.

3. The method of processing in random access procedure as claimed in claim 1, wherein the TA is calculated by one of the transparent relay stations, and wherein the base station transmitting the collision detection result to the random access node through the contention resolution message comprises:
    the base station transmitting the contention resolution message carrying the TA calculated by the one of the transparent relay stations and the collision detection result to the transparent relay station; and
    the one of the transparent relay stations transmitting the contention resolution message to the random access node.

4. The method of processing in random access procedure as claimed in claim 1, wherein the base station calculates the TA according to the Preamble detected by the base station.

5. The method of processing in random access procedure as claimed in claim 1, wherein the base station calculates the Timing Alignment (TA) according to the Preamble detected by the base station.

6. The method of processing in random access procedure as claimed in claim 1, wherein one of the transparent relay stations calculates the Timing Alignment (TA) according to the Preamble detected by the base station.

7. The method of processing in random access procedure as claimed in claim 1, wherein both the base station and the one of the transparent relay stations record the detected Preamble and calculate the TA according to the Preamble detected by the base station.

8. The method of processing in random access procedure as claimed in claim 1, wherein the base station starting the timer includes starting a timing device to set a time period for which the base station waits for all of the number of transparent relay stations to report the detected random access detection information.

9. The method of processing in random access procedure as claimed in claim 1, wherein the random access node is a user terminal.

10. A method of processing in random access procedure, the method comprising:
   a random access node transmitting a Preamble to a base station; the random access node receiving, in a random access response message, a Timing Alignment (TA) calculated, by the base station, by each of a number of transparent relay devices or by both, according to the Preamble, and adjusting an uplink timing advance according to the TA calculated by the base station;
   the random access node transmitting uplink signaling to the base station in response to adjusting the timing advance;
   the random access node receiving a contention resolution message transmitted by the base station, the contention resolution message including a collision detection result determined from identification information in the uplink signaling transmitted by the random access node;
   the random access node adjusting the uplink timing advance according to the TA included in the contention resolution message; and
   the random access node finishing an access procedure based on at least the collision detection result;
   wherein receiving the contention resolution message comprises:
      the base station receiving random access detection information reported from one of the transparent relay stations, and selecting one of the transparent relay stations or the base station as a service node for the random access node,
      if one of the transparent relay stations is selected as the service node, the base station notifying the random access node of an access condition along with the TA calculated by the service node in the contention resolution message sent through the selected service node to the random access node, and
      if the base station is selected as the service node, the base station notifying the random access node of the access condition in the contention resolution message sent to the random access node without relaying through the transparent relay stations.

11. The method of processing in random access procedure as claimed in claim 10, wherein the random access node receiving the contention resolution message transmitted by the base station comprises:
   the base station transmitting the contention resolution message carrying the collision detection result to one of the transparent relay stations; and
   the one of the transparent relay stations transmitting the contention resolution message to the random access node.

12. The method of processing in random access procedure as claimed in claim 10, wherein the base station calculates the Timing Alignment (TA).

13. The method of processing in random access procedure as claimed in claim 10, wherein all of the transparent relay stations calculates the Timing Alignment (TA).

14. The method of processing in random access procedure as claimed in claim 10, wherein both the base station and the one of the transparent relay stations receive and record the detected Preamble and calculate the TA according to the Preamble.

15. The method of processing in random access procedure as claimed in claim 10, wherein the base station starting the timer includes starting a timing device to set a time period for which the base station waits for all of the transparent relay stations to report the detected random access detection information.

16. The method of processing in random access procedure as claimed in claim 10, wherein the random access node is a user terminal.

* * * * *